United States Patent [19]

Kumada et al.

[11] Patent Number: 5,607,239
[45] Date of Patent: Mar. 4, 1997

[54] BEARING UNIT

[75] Inventors: Yoshio Kumada; Katsuyuki Hashizume; Soji Kamiya, all of Toyota, Japan

[73] Assignee: Taiho Kogyo Co., Ltd., Toyota, Japan

[21] Appl. No.: 553,585

[22] PCT Filed: Mar. 17, 1995

[86] PCT No.: PCT/JP95/00468

§ 371 Date: Nov. 16, 1995

§ 102(e) Date: Nov. 16, 1995

[87] PCT Pub. No.: WO95/25905

PCT Pub. Date: Sep. 28, 1995

[30] Foreign Application Priority Data

Mar. 18, 1994 [JP] Japan .................. 6-073963

[51] Int. Cl.⁶ .................. F16C 23/04; F16C 33/24
[52] U.S. Cl. .................. 384/192; 384/283
[58] Field of Search .................. 384/192, 276, 384/282, 283, 284, 291, 292, 294

[56] References Cited

U.S. PATENT DOCUMENTS

| 4,400,099 | 8/1983 | Ehrentraut ............... 384/283 |
| 4,538,929 | 9/1985 | Ehrentraut et al. ............... 384/120 |
| 4,561,787 | 12/1985 | Ehrentraut et al. ............... 384/276 X |
| 4,562,122 | 12/1985 | Hodes et al. ............... 384/276 X |
| 4,606,653 | 8/1986 | Ehrentraut et al. ............... 384/276 X |
| 4,995,765 | 2/1991 | Dansdill ............... 384/192 X |
| 5,000,586 | 3/1991 | Daxer et al. ............... 384/282 X |
| 5,071,263 | 12/1991 | Kamiya et al. ............... 384/284 |
| 5,116,144 | 5/1992 | Kamiya et al. ............... 384/291 |
| 5,238,311 | 8/1993 | Katou et al. ............... 384/292 X |

FOREIGN PATENT DOCUMENTS

| 385822B | 5/1988 | Austria . |
| 0155257B1 | 9/1985 | European Pat. Off. . |
| 0155257A2 | 9/1985 | European Pat. Off. . |
| 60-205014 | 10/1985 | Japan . |
| 63-6215 | 1/1988 | Japan . |
| 63-30619 | 2/1988 | Japan . |
| 63-11530 | 3/1988 | Japan . |
| 2-142921 | 6/1990 | Japan . |
| 4-39461 | 9/1992 | Japan . |
| 5-6412 | 2/1993 | Japan . |
| 5-8337 | 3/1993 | Japan . |
| 6-19850 | 5/1994 | Japan . |

Primary Examiner—Thomas R. Hannon
Attorney, Agent, or Firm—Flynn, Thiel, Boutell & Tanis, P.C.

[57] ABSTRACT

Peaks $4b$ which extend circumferentially are formed around the inner peripheral surface of a bearing alloy layer 4 which forms a sliding bearing 2. When a total error resulting from manufacturing tolerances and an assembly error of a rotating shaft 3 and the sliding bearing 2 are denoted by W, the height of the peak by h, and an axial pitch of the peaks by p, the parameters W, h and p are chosen to satisfy the following requirements:

$$2 \leq h \leq 10 \quad (1),$$
$$1 \leq W \leq 8 \quad (2),$$
$$h \leq 4W/3 + 14/3 \quad (3),$$
$$50 \leq p \leq 600 \quad (4),$$

and $$p \leq -250h/3 + 3250/3 \quad (5)$$

where h, p and W are measured in unit of μm. Such selection of the parameters achieves an excellent abrasion resistance without providing an overlay layer around the inner peripheral surface of the bearing alloy layer 4.

8 Claims, 4 Drawing Sheets

FIG. 6

| shape error (μm) | height (μm) | pitch (μm) 100 | | sample | 200 | | 400 | | 600 | | control |
|---|---|---|---|---|---|---|---|---|---|---|---|
| 1 | 2 | ⊚ | 95 | 1 | △ | 90 | △ | 90 | △ | 90 | 90 |
|   | 4.5 | ○ | 100 | 2 | ⊚ | 95 | △ | 90 | △ | 90 |  |
|   | 7 | △ | 90 | 3 | △ | 90 | △ | 90 | × | 80 |  |
|   | 10 | × | 80 | 4 | × | 80 | × | 80 | × | 70 |  |
|   | 12 | × | 80 | 5 | × | 70 | × | 70 | × | 70 |  |
| 2 | 2 | ○ | 90 | 6 | ○ | 90 | △ | 80 | △ | 80 | 80 |
|   | 4.5 | ○ | 100 | 7 | ○ | 100 | ○ | 90 | ○ | 90 |  |
|   | 7 | ⊚ | 85 | 8 | △ | 80 | △ | 80 | × | 70 |  |
|   | 10 | × | 70 | 9 | × | 75 | × | 70 | × | 60 |  |
|   | 12 | × | 60 | 10 | × | 65 | × | 60 | × | 60 |  |
| 4 | 2 | ○ | 70 | 11 | ○ | 70 | △ | 60 | △ | 60 | 60 |
|   | 4.5 | ○ | 80 | 12 | ○ | 80 | ○ | 80 | ○ | 80 |  |
|   | 7 | ○ | 70 | 13 | ○ | 70 | ○ | 70 | △ | 60 |  |
|   | 10 | ⊚ | 65 | 14 | ⊚ | 65 | △ | 60 | × | 50 |  |
|   | 12 | △ | 60 | 15 | × | 50 | × | 50 | × | 50 |  |
| 6 | 2 | ○ | 60 | 16 | ○ | 60 | ○ | 60 | △ | 50 | 50 |
|   | 4.5 | ○ | 70 | 17 | ○ | 70 | ○ | 65 | ○ | 60 |  |
|   | 7 | ○ | 60 | 18 | ○ | 60 | ○ | 60 | △ | 50 |  |
|   | 10 | ○ | 60 | 19 | ⊚ | 55 | △ | 50 | × | 40 |  |
|   | 12 | × | 45 | 20 | × | 40 | × | 40 | × | 40 |  |
| 8 | 2 | ○ | 60 | 21 | ○ | 55 | ○ | 50 | ○ | 50 | 40 |
|   | 4.5 | ○ | 65 | 22 | ○ | 60 | ○ | 60 | ○ | 50 |  |
|   | 7 | ○ | 60 | 23 | ○ | 50 | ○ | 50 | △ | 40 |  |
|   | 10 | ○ | 50 | 24 | ⊚ | 45 | △ | 40 | × | 30 |  |
|   | 12 | × | 30 | 25 | × | 35 | × | 30 | × | 30 |  | decision: ⊚ = excellent  ○ = good  △ = comparable  × = inferior

BEARING UNIT

TECHNICAL FIELD

The invention relates to a bearing unit, and more particularly, to a bearing unit including a sliding bearing having an annular groove formed around its inner peripheral surface, and a rotating shaft which is rotatably journalled by the sliding bearing.

BACKGROUND OF THE INVENTION

A bearing unit is generally designed to provide a smooth rotation under fluid lubricated condition, and a minimum oil film thickness or a minimum clearance between a rotating shaft and a sliding bearing is about 0.5 to 1 μm.

It is to be noted, however, that there is a manufacturing tolerance on the order of about 1 to 5 μm for the rotating shaft, a similar manufacturing error for the sliding bearing, and also there is an assembly tolerance as caused by such factors as a tilting of the rotating shaft and so on which may be on the order of about 1 to 3 μm. A total error W is obtained as a squared mean of these values, which is generally in a range from 1.7 to 7.7 μm.

Because the magnitude of the total error W is greater than the minimum thickness of the oil film as described above, it has been the practice in the prior art to provide a soft overlay layer on the surface of the sliding bearing in order to accommodate for a difference therebetween (see, for example, Japanese Laid-Open Patent Application No. 205,014/1985).

A bearing unit is also known in the art including a sliding bearing including a bearing alloy layer having a plurality of axially spaced, circumferentially extending annular grooves formed around its inner peripheral surface to define circumferentially extending peaks between pairs of axially adjacent annular grooves, and a rotating shaft which is rotatably journalled by the sliding bearing (refer Japanese Patent Publication No. 11,530/1988).

As mentioned, the provision of a soft overlay layer is required in order to accommodate for a total error W, and if such overlay layer is not provided, a seizure resistance is degraded as a result of localized abutments.

In the bearing unit described in the cited Patent Publication in which annular grooves are formed around the inner peripheral surface of the sliding bearing, each of these annular grooves is utilized as a path for a lubricating oil, and the peak defined between a pair of axially adjacent annular grooves is not utilized as means to accommodate for the total error W.

DISCLOSURE OF THE INVENTION

The invention provides a bearing unit which accommodates for a total error W in the absence of an overlay layer, by utilizing a peak defined between adjacent annular grooves as means to accommodate for the total error W.

Specifically, according to the invention, there is provided a bearing unit including a sliding bearing having a bearing alloy layer having a plurality of axially spaced, circumferentially extending annular grooves formed around its inner peripheral surface to define circumferentially extending peaks between pairs of axially adjacent annular grooves, and a rotating shaft which is rotatably journalled by the sliding bearing. In accordance with the invention, when a total error caused by manufacturing tolerances and an assembly error of and between the rotating shaft and the sliding bearing by W, a height of the peak by h, and an axial pitch of the peaks by p, these parameters W, h and p are chosen to satisfy the following requirements:

$$2 \leq h \leq 10 \tag{1}$$

$$1 \leq W \leq 8 \tag{2}$$

$$h \leq 4W/3 + 14/3 \tag{3}$$

$$50 \leq p \leq 600 \tag{4}$$

$$p \leq -250h/3 + 3250/3 \tag{5}$$

where h, P and W are measured in unit of μm.

When the inequalities (1) to (3) are modified as follows, there is obtained a bearing unit which is preferred for use in a gasoline engine:

$$2 \leq h \leq 7 \tag{1a}$$

$$1 \leq W \leq 6 \tag{2b}$$

$$3W/5 + 7/5 \leq h \leq W/3 + 5 \tag{3a}$$

Additionally, when the inequalities (1) to (3) are modified as follows, there is obtained a bearing unit which is preferred for use in a diesel engine:

$$4 \leq h \leq 10 \tag{1b}$$

$$1 \leq W \leq 6 \tag{2}$$

$$2W/5 + 18/5 \leq h \leq W + 5 \tag{3a}$$

With the present invention constructed in the manner mentioned above, the top of the peak can be prematurely abraded to cause a plastic deformation thereof so as to accommodate for the total error. As a consequence, there is achieved a satisfactory seizure resistance without providing an overlay layer, as will be demonstrated by results of tests to be described later.

BRIEF DESCRIPTION OF THE DRAWINGS

FIG. 6 is a chart indicating results of tests conducted to demonstrate the abrasion resistance of the products according to the invention.

BEST MODE OF CARRYING OUT THE INVENTION

Figure 1:
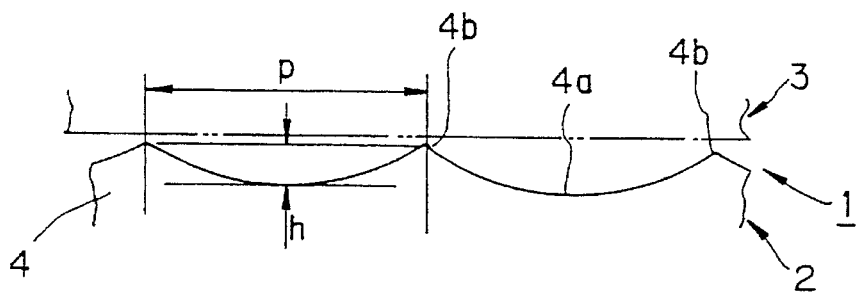
FIG. 1 is an axial section of a bearing unit according to the invention.

Referring to the drawings, several embodiments of the invention will now be described. Initially referring to FIG. 1, a bearing unit 1 includes a sliding bearing 2 which is shaped in a semi-cylindrical or cylindrical configuration, and a rotating shaft 3 which is rotatably journalled by the sliding bearing 2. The sliding bearing 2 includes a bearing alloy layer 4 on a backing, not shown, and a helical annular groove 4a, which extends circumferentially, is formed around the inner peripheral surface of the alloy layer 4, thus defining a peak 4b which extends circumferentially between a pair of axially adjacent annular grooves 4a.

Figure 2:
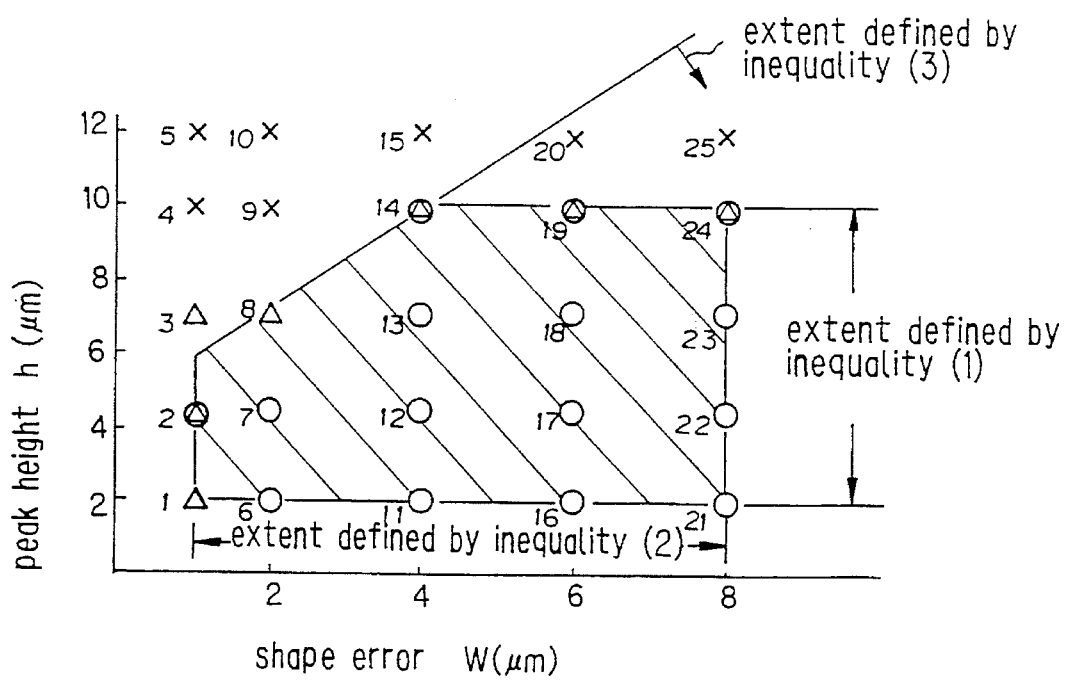
FIG. 2 graphically defines an extent in which the invention is used.

FIG. 2 graphically illustrates the relationship between the height of the peak 4b and a total error. In accordance with the invention, when the height of the peak 4b is denoted by h and the total error by W, which are taken on the ordinate and on the abscissa, respectively, of a graphical representation shown in FIG. 2, the parameters h and W are located in an area, shown hatched in FIG. 2, which are defined by the following inequalities:

$$2 \leq h \leq 10 \quad (1)$$

$$1 \leq W \leq 8 \quad (2)$$

$$h \leq 4W/3 + 14/3 \quad (3)$$

where these parameters are measured in unit of μm.

It is to be noted that when the height of the peak 4b is increased, there is a tendency that a load capacity increases due to squeeze film pressure, but decreases due to wedge film pressure. When a high speed rotation prevails and a force of rotational inertia is dominant as in a gasoline engine, the wedge film pressure principally supports the rotating shaft. By contrast, when an explosive force is dominant as in a diesel engine, the squeeze film pressure supports the rotating shaft. As a consequence, it is desirable to achieve a smooth operation upon accommodation of the total error that a low height of the peak be chosen for a gasoline engine while an increased height of the peak be chosen for a diesel engine.

Figure 3:
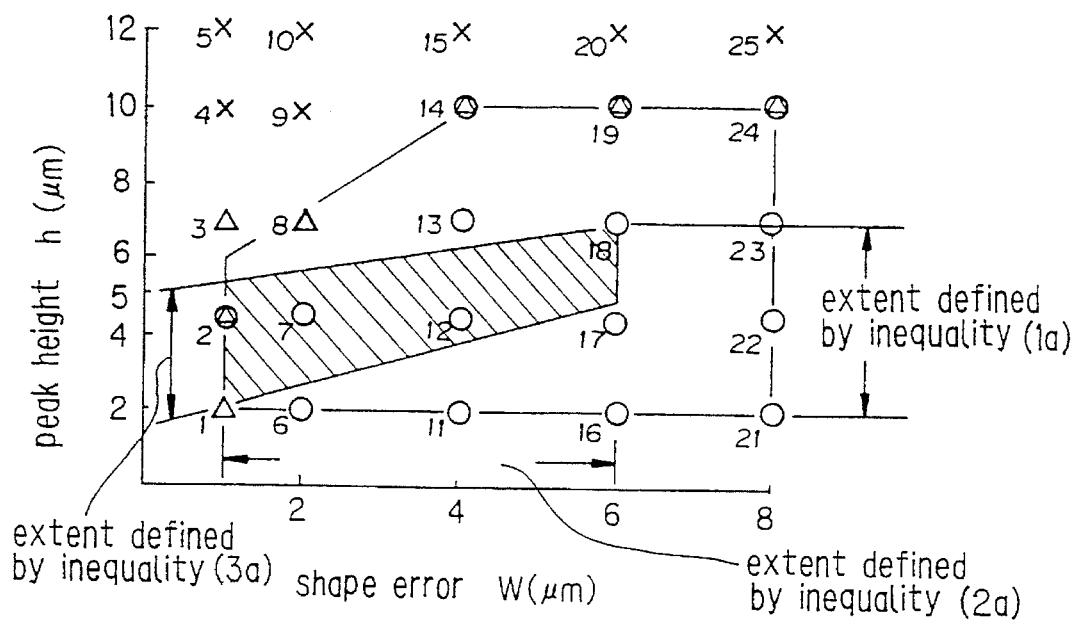
FIG. 3 graphically shows an extent of the invention which is chosen for its preferred use in an gasoline engine.

Specifically, it is desirable that the requirements represented by the inequalities (1) to (3) be modified as indicated below for a gasoline engine, such extent being shown hatched in FIG. 3:

$$2 \leq h \leq 7 \quad (1a)$$

$$1 \leq W \leq 6 \quad (2a)$$

$$3W/5 + 7/5 \leq h \leq W/3 + 5 \quad (3a)$$

Figure 4:
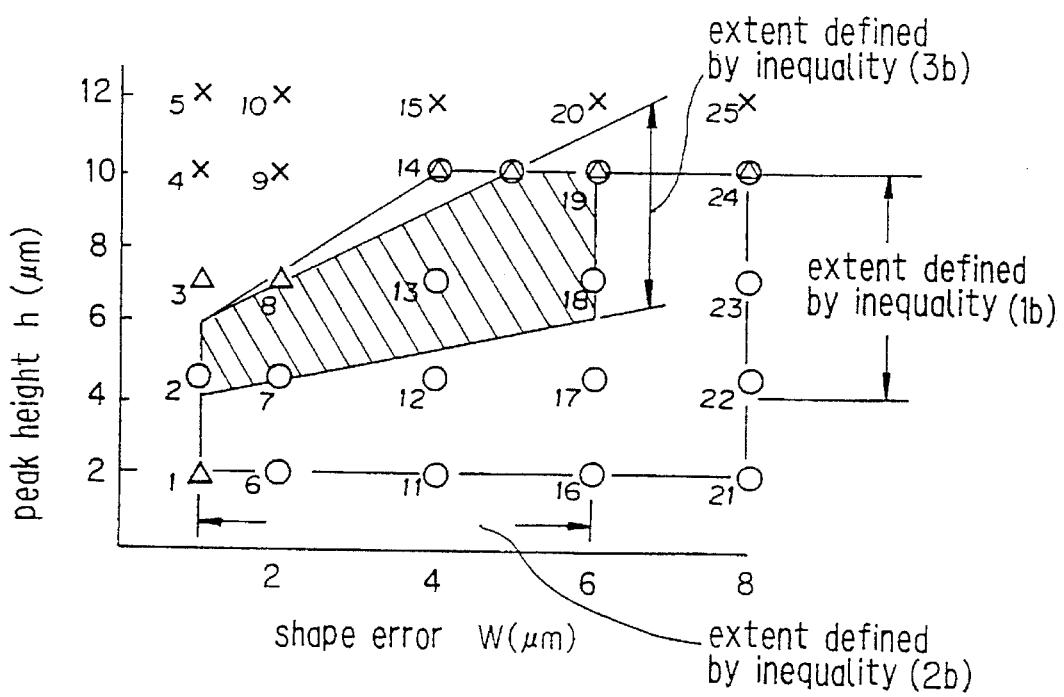
FIG. 4 graphically shows an extent of the invention which is chosen for its preferred use in a diesel engine.

On the other hand, it is desirable that the requirements represented by the inequalities (1) to (3) be modified as follows for a diesel engine, such area being shown hatched in FIG. 4:

$$4 \leq h \leq 10 \quad (1b)$$

$$1 \leq W \leq 6 \quad (2b)$$

$$2W/5 + 18/5 \leq h \leq W + 5 \quad (3b)$$

Figure 5:
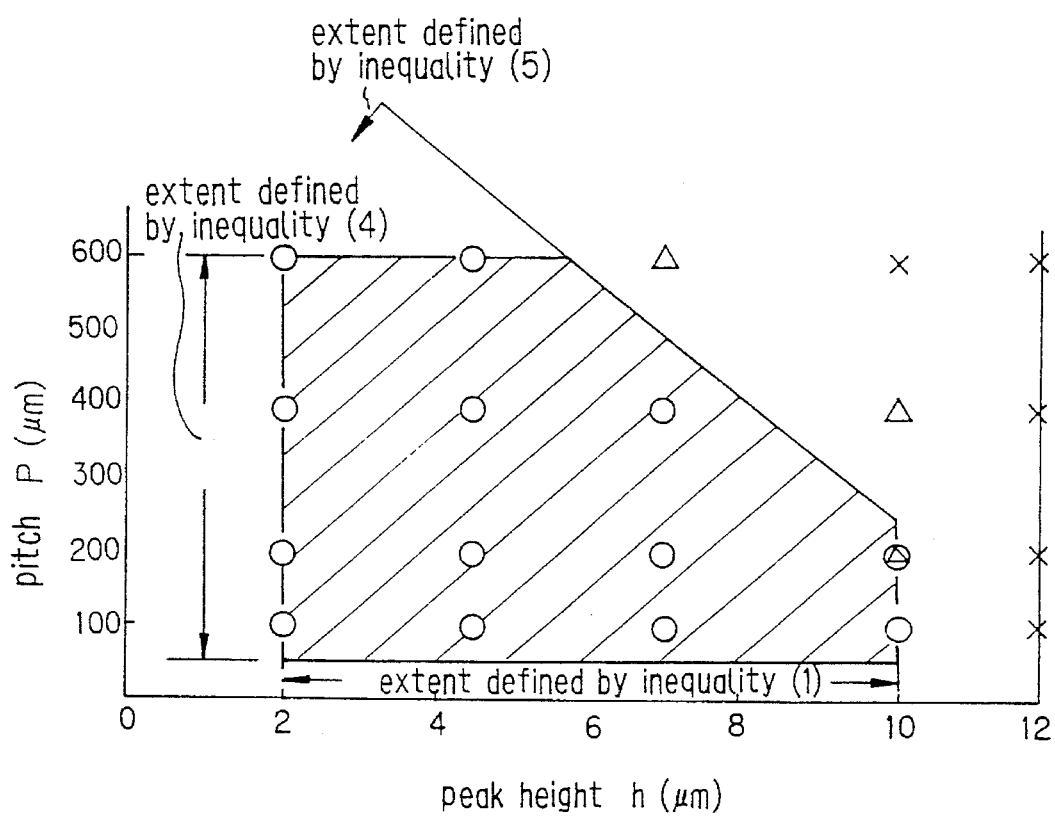
FIG. 5 graphically shows a different extent of the invention.

FIG. 5 graphically illustrates a relationship between the height h of the peak 4b and the axial pitch p (see FIG. 1) of the peaks, taken on the ordinate and on the abscissa, respectively. The parameters h and p are chosen in a range, which is shown hatched in FIG. 5, which is in turn defined by the following inequalities:

$$50 \leq p \leq 600 \quad (4)$$

$$p \leq -250h/3 + 3250/3 \quad (5)$$

To achieve an early abrasion and a plastic deformation of the top of the peak, it is desirable that the bearing alloy layer 4 has a hardness on the order of Hv 30 to 60. If an overlay layer is provided on the surface of the bearing alloy layer 4 either directly or with an intermediate layer interposed, it is desirable that the bearing alloy layer 4 has a hardness on the order of Hv 40 to 90.

The effect of the invention will be demonstrated below in terms of results obtained from a seizure resistance test.

The testing conditions are as follows:

Testing machine: Seizure testing machine of journal type

Number of revolutions: 1,300 rpm

Lubricating oil: 10W–30

Oil temperature: 140° C.

Rotating shaft: S45C hardened, diameter 42 mm

Oil clearance: 20 to 50 μm

Sliding bearing: An Al system bearing alloy layer 4 comprising Al-12 Sn-1.5 Pb-2.8 Si-1 Cu-0.2 Cr is pressure welded on a backing comprising SPCC, and annular grooves 4a are formed with a required pitch p and to a required depth.

As a control, a sliding bearing is prepared in which no annular groove 4a is formed but an overlay layer is provided with an intermediate layer interposed. Specifically, the control comprises a bearing alloy layer having the same composition as used according to the invention, which is pressure welded to a backing comprising SPCC. The surface of the alloy layer is smoothly formed by a broach operation. Subsequently, a Ni plating is applied to a thickness of 2 μm to the surface of the alloy layer to provide an intermediate layer. An overlay layer comprising Pb—Sn—In—Cu and having a thickness of 16 μm is applied, by electroplating, on top of the Ni plated layer.

The testing procedure comprises an initial shakedown run for one hour under a surface pressure of 5 MPa, followed by increasing the surface pressure to 10 MPa, and subsequently increasing the surface pressure stepwise by 10 MPa at an interval of 45 minutes while recording friction torque and bearing back surface temperature. The occurrence of a seizure is determined by watching a rapid increase in the friction torque, and a surface pressure which prevails when the friction torque exceeds 10.8 N.m is determined to be a seizure surface pressure. If a seizure occurs while increasing the load, a seizure surface pressure is determined as a mean of values obtained across such occurrence. It is to be noted that the lubrication employs an oil bath, and a testing instrument is completely immersed in the oil bath. The temperature of lubricating oil is controlled by a separate oil feed unit, and the oil is circulated through the bath at a rate of 1 dm³/min, and a temperature of the oil bath is maintained at 140° C.

In the chart shown in FIG. 6, samples having a pitch equal to or greater than 200 μm are numbered from 1 to 25. Decisions entered in the chart are results of each sample against the control which is not formed with the annular groove 4a and which includes an overlay layer with an interposed intermediate layer. These results of decisions rendered for the samples 1 to 25 are also illustrated in FIGS. 2 to 4.

The results of decisions illustrated in FIG. 5 are those four samples having a total error of 8 μm as indicated in FIG. 6.

The total error W shown in FIG. 6 is obtained as a squared mean of measured values of an error of straightness of the rotating shaft 3, an error of the straightness of the sliding bearing 2 as assembled into a housing, and an angular error or inclination of the rotating shaft 3 as assembled.

As will be noted from the results of tests shown in FIG. 6 as well as FIGS. 2 to 5, it will be seen that samples which lie within the extent defined by the invention attain, without the provision of an overlay layer, a seizure resistance which is equal to or better than that of the control including an overlay layer, thus demonstrating the functionability of the peaks 4b.

It will be understood from the results of the tests illustrated in FIG. 6 that a favorable result is obtained from pitches in a range from 100 to 400 μm.

It should be understood that an overlay layer may be provided in the arrangement of the invention, and the provision of an overlay layer may enhance the seizure resistance by 20 to 30%.

Figure 7:
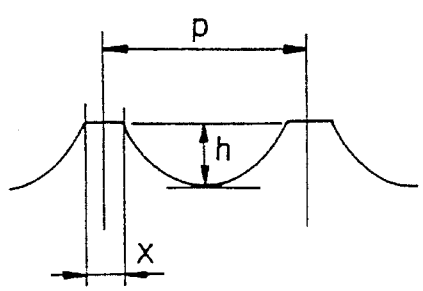
FIG. 7 is an axial section of another embodiment of the invention.

Finally, as shown in FIG. 7, the top of the peak 4a may be formed flat. In such instance, the width X of the top should desirably be in a range of X/p<0.3.

What is claimed is:

1. A bearing unit including a sliding bearing having a bearing alloy layer having a plurality of axially spaced, circumferentially extending annular grooves formed around its inner peripheral surface to define circumferentially extending peaks between pairs of axially adjacent annular grooves, and a rotating shaft which is rotatably journalled by the sliding bearing;

characterized in that when a total error caused by manufacturing tolerances and an assembly error of and between the rotating shaft and the sliding bearing by W, a height of the peak by h, and an axial pitch of the peaks by p, these parameters W, h and p are chosen to satisfy the following requirements:

$$2 \leq h \leq 10 \quad (1)$$

$$1 \leq W \leq 8 \quad (2)$$

$$h \leq 4W/3 + 14/3 \quad (3)$$

$$50 \leq p \leq 600 \quad (4)$$

$$p \leq -250h/3 + 3250/3 \quad (5)$$

where h, p and W are measured in unit of μm.

2. A bearing unit according to claim 1 in which the height h of the peak and the total error W are in a range as defined below:

$$2 \leq h \leq 7 \quad (1a)$$

$$1 \leq W \leq 6 \quad (2a)$$

$$3W/5 + 7/5 \leq h \leq W/3 + 5 \quad (3a).$$

3. A bearing unit according to claim 1 in which the height h of the peak and the total error W are in a range as defined below:

$$4 \leq h \leq 10 \quad (1b)$$

$$1 \leq W \leq 6 \quad (2b)$$

$$2W/5 + 18/5 \leq h \leq W + 5 \quad (5b).$$

4. A bearing unit according to claim 1 in which the sliding bearing comprises a backing and the bearing alloy layer, the bearing alloy layer having a hardness in a range from Hv 30 to 60.

5. A bearing unit according to one of claim 1 in which the sliding bearing comprises a backing, the bearing alloy layer, and an overlay layer applied to the surface of the bearing alloy layer either directly or with an intermediate layer interposed therebetween, the bearing alloy layer having a hardness in a range from Hv 40 to 90.

6. A bearing unit according to one of claim 1 in which axially adjacent peaks have a pitch p which is in a range from 100 to 600 μm.

7. A bearing unit according to claim 6 in which axially adjacent peaks have a pitch p in a range from 100 to 400 μm.

8. A bearing unit according to one of claim 1 in which the peak has a flat top having a width X, which is characterized by being X/p<0.3.

* * * * *

UNITED STATES PATENT AND TRADEMARK OFFICE
CERTIFICATE OF CORRECTION

PATENT NO. : 5 607 239
DATED : March 4, 1997
INVENTOR(S) : Yoshio KUMADA, et al.

It is certified that error appears in the above-indentified patent and that said Letters Patent is hereby corrected as shown below:

Column 6, line 25; delete "one of".
          line 30; delete "one of".
          line 35; delete "one of".

Signed and Sealed this

Seventeenth Day of June, 1997

Attest:

Attesting Officer

BRUCE LEHMAN
Commissioner of Patents and Trademarks